United States Patent [19]

Irie et al.

[11] Patent Number: 4,920,202

[45] Date of Patent: Apr. 24, 1990

[54] METHOD FOR PRODUCTION OF HYDROPHILIC POLYMER FROM HYDRATED GEL POLYMER

[75] Inventors: Yoshio Irie; Kaoru Iwasaki; Takumi Hatsuda, all of Himeji; Kazumasa Kimura, Osaka; Nobuyuki Harada; Kunihiko Ishizaki, both of Suita; Tadao Shimomura, Toyonaka; Teruaki Fujiwara, Himeji, all of Japan

[73] Assignee: Nippon Shokubai Kagaku Kogyo Co., Ltd., Osaka, Japan

[21] Appl. No.: 187,866

[22] Filed: Apr. 29, 1988

[30] Foreign Application Priority Data

Apr. 30, 1987 [JP] Japan ................. 62-104764

[51] Int. Cl.$^5$ ............................................. C08F 6/00
[52] U.S. Cl. .................................. 528/500; 528/481; 528/503; 526/240; 526/307.7; 34/36
[58] Field of Search ............... 528/481, 500, 503; 523/328; 34/36; 526/240, 307.7

[56] References Cited

U.S. PATENT DOCUMENTS

| | | | |
|---|---|---|---|
| 2,960,486 | 11/1960 | Pye | 260/45.7 |
| 3,573,263 | 3/1971 | Gill | 260/79.3 |
| 4,076,663 | 2/1978 | Masuda et al. | 260/17.4 GC |
| 4,132,844 | 1/1979 | Coville | 528/499 |
| 4,193,903 | 3/1980 | Giddings et al. | 260/29.6 R |
| 4,306,955 | 12/1981 | Neel et al. | 528/487 X |
| 4,365,057 | 12/1982 | Saito et al. | 528/503 |
| 4,625,001 | 11/1986 | Tsubakimoto et al. | 526/88 |
| 4,789,713 | 12/1988 | Sanner et al. | 528/500 X |

FOREIGN PATENT DOCUMENTS

| | | | |
|---|---|---|---|
| 2822483 | 12/1978 | Fed. Rep. of Germany | 528/499 |
| 33-2646 | 4/1958 | Japan | 528/492 |
| 48-42466 | 12/1973 | Japan | 526/88 |
| 50-40689 | 4/1975 | Japan | 528/492 |
| 50-44280 | 4/1975 | Japan | 526/303.1 |
| 50-96689 | 7/1975 | Japan | 526/303.1 |
| 53-141388 | 12/1978 | Japan | 526/303.1 |
| 54-155296 | 12/1979 | Japan | 526/303.1 |
| 57-34101 | 2/1982 | Japan | 526/88 |
| 58-49714 | 3/1983 | Japan | 526/240 |
| 59-133205 | 7/1984 | Japan | 526/218.1 |
| 60-295323 | 7/1985 | Japan | 526/303.1 |
| 61-275355 | 12/1986 | Japan | 428/394 |
| 62-53309 | 3/1987 | Japan | 526/88 |
| 62-243612 | 10/1987 | Japan | 526/88 |
| 2176815A | 1/1987 | United Kingdom | 526/930 |

*Primary Examiner*—Joseph L. Schofer
*Assistant Examiner*—F. M. Teskin
*Attorney, Agent, or Firm*—Omri M. Behr

[57] ABSTRACT

A method for the production of a hydrophilic polymer having a small residual monomer content from a hydrated gel polymer, which method comprises drying said hydrated gel polymer by contact thereof with a gas containing at least steam and having a dew point in the range of 50° to 100° C. at a temperature in the range of 80° C. to 250° C., and a hydrophilic polymer obtained therefrom.

17 Claims, 1 Drawing Sheet

METHOD FOR PRODUCTION OF HYDROPHILIC POLYMER FROM HYDRATED GEL POLYMER

BACKGROUND OF THE INVENTION

1. Field of the Invention

This invention relates to a hydrophilic polymer and a method for the production thereof. More particularly, it relates to a hydrophilic polymer such as a water-soluble or water swellable polymer having a small residual monomer content and a method for the production of the polymer from a hydrated gel polymer.

2. Description of the Prior Art

Such water-soluble polymers as polysodium acrylate, polyacrylamide, partial hydrolyzates of polyacrylamide, and polyvinyl alcohol have the ability to produce a hydrated gel polymer on being subjected to solution polymerization. These water-soluble polymers have been finding utility in water-treatment grade flocculants, oil-excavation grade sludge additives, food additives, and tackifiers, for example.

Examples of the water-swellable polymers which, on being subjected to solution polymerization, produce a hydrated gel polymer include cross-linked polyacrylates, saponified acrylic ester-vinyl acetate copolymers, modified cross-linked polyvinyl alcohols, partially neutralized cross-linked polyacrylates, cross-linked isobutylene-maleic anhydride copolymer, and starch-acrylic acid graft polymer They have been finding utility in sanitary absorbents such as sanitary articles and disposable diaper, water-retaining agents for agriculture, horticulture, and forestation, and films for preserving foodstuffs. They have a prospect of further growth in demand in the future. In these applications, the polymers have the possibility of touching the human skin and even being absorbed in the human body. When they are discarded after use, they develop the possibility of straying in the environment and eventually mingling into drinking water. The demand for minimization of the residual monomer content in the polymer is gradually gaining in impetus in recent years.

For the purpose of decreasing residual monomer contents in hydrated gel polymers, there have been proposed methods which attain the decrease by addition of ammonia and amines (Japanese Patent Publication SHO 33(1958)-2,646 and Japanese Patent Laid-Open SHO 50(1975)-40,689) and addition of sulfites and hydrogensulfites (U.S. Pat. Nos. 2,960,486 and 4,306,955) to residual monomers, methods which accomplish the decrease by polymerizing residual monomers by combined use of low-temperature decomposition type and high-temperature decomposition type initiators (Japanese Patent Publication SHO 50(1975)-44,280 Japanese Patent Laid-Open SHO 59(1984)-133,205, and Japanese Patent Laid-Open SHO 53(1978)-141,388) and combined use of redox initiators and azo type initiators (Japanese Patent Laid-Open SHO 50(1975)-96,689 and U.S. Pat. No. 3,573,263), and a method which attains the decrease by decomposition of residual monomers with microorganisms (Japanese Patent Publication SHO 60(1985)-29,523).

The addition of ammonia, amines, sulfites, and hydrogen-sulfites is fairly effective in decreasing residual monomers. Insufficient use of these compounds is futile. Further, use of these compounds poses a problem that these added compounds are left manifesting their inherent toxicity The methods resorting to combined use of initiators are not sufficiently effective in decreasing residual monomers The method relying on microorganisms has a disadvantage that it is not sufficiently feasible economically.

A conduction heat-transfer type drier, a radiation heat-transfer type drier, or a hot-air heat-transfer type drier can be used for producing a water-soluble or water-swellable polymer by drying a hydrated gel polymer. By reason of fastness of the work of drying, the hot-air heat-transfer type drier (hereinafter referred to as "hot-air drier") finds popular acceptance. The method thus resorting to the heat-transfer drier, however, cannot remove the residual monomers sufficiently, although water contained in the polymer can be removed effectively.

A method has been proposed for the production of a water-soluble polymer by the polymerization of an aqueous solution of 40 to 80% by weight of acrylamide or a mixture of acrylamide with other vinyl monomer, which method comprises depositing the aqueous solution in the form of a film on a solid support and polymerizing the film of the aqueous solution under a polymerization atmosphere having a relative humidity kept at a level exceeding 60% (Japanese Patent Laid-Open SHO 54(1979)-155,296). The method of this nature, however, can be applied only to the polymer polymerized by the specific polymerization method and further it is very difficult to attain the highly decreased residual monomer content.

An object of this invention, therefore, is to provide a hydrophilic polymer and a method for the production thereof.

Another object of this invention is to provide a hydrophilic polymer such as a water-soluble or water-swellable polymer having a low residual monomer content and a method for production of the polymer mentioned above from a hydrated gel polymer.

SUMMARY OF THE INVENTION

The objects described above are accomplished by a method for the production of a hydrophilic polymer having a small residual monomer content from a corresponding hydrated gel polymer, which method comprises drying the hydrated gel polymer by contact thereof with a gas containing at least steam possessing a dew point of 50° to 100° C., and at a temperature of 80° to 250° C.

By the method of this invention, the hydrophilic polymer such as the water-soluble or water-swellable polymer can be obtained with an extremely small residual monomer content When this method is effected by the use of a drier operated by cyclic use of hot air, since the steam evaporating from the hydrated gel polymer can be immediately utilized for elevating the dew point of the hot air for heating, the amount of fresh air to be introduced for replenishment of the hot air can be proportionately decreased and the energy spent in heating the fresh air can be decreased likewise. Further in the case of an aeration band type drier, if the hot air used for the drying has a low dew point as usual, there may be witnessed a phenomenon that the upper, medium, and lower sides of a material of an appreciable thickness will acquire mutually different physical properties. This unevenness of the heating can be alleviated by the method of the present invention.

The hydrophilic polymer which is obtained by the method of this invention, therefore, is incapable of adversely affecting the human body or the environment and can be advantageously utilized in applications to water-treatment grade flocculants, oil-excavation grade sludge additives, food additives, sanitary absorbents, water-retaining agents, and films for preservation of foodstuffs, for example.

DESCRIPTION OF THE PREFERRED EMBODIMENT

Figure 1:
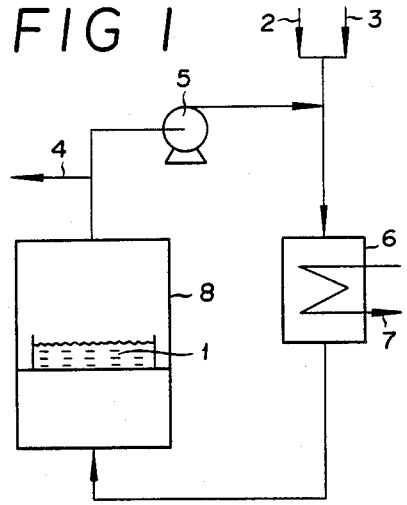
FIG. 1 is a schematic explanatory diagram illustrating a drier used in Examples 1 to 13 of the present invention and Controls 1 to 7.

The invention is a water-soluble or water-swellable hydrated gel polymer obtained by solution polymerization of a monomer. It is a gel polymer whch contains unaltered monomer and, if necessary, if finely divided so as to possess a surface area enough to be thoroughly dried by the gas described above.

As examples of the hydrated gel polymer, (1) the product obtained by polymerizing a monomer placed in a frame and, if necessary, finely dividing the consequently produced hydrated gel polymer with a meat chopper, an extruder, or a kneader, for example as disclosed in Japanese Patent Publication SHO 48(1973)-42,466 and U.S. Pat. No. 4,625,001, (2) the finely divided hydrated polymer obtained by polymerizing a monomer in a kneader, for example, which is provided therein stirring blades capable of finely dividing the polymer produced therein as disclosed in Japanese Patent Laid-Open SHO 57(1982)-34,101, (3) the product obtained by polymerizing a monomer being carried on a belt conveyor and, if necessary, finely dividing the consequently produced hydrated gel polymer with a meat chopper, an extruder, or a kneader, for example, as disclosed in Japanese Patent Laid-Open SHO 58(1983)-49,714, (4) the pearly hydrated gel polymer obtained by reverse phase suspension polymerizing a monomer as disclosed in U.S. Pat. No. 4,076,663, and (5) the hydrated gel polymer fixed on a fibrous substrate by polymerizing monomers which have been sprayed or coated on the fibrous substrate as disclosed in Japanese Patent Laid-Opens SHO 61(1986)-275,355, SHO 62(1987)-243,612, and SHO 62(1987)-53,309 can be cited As examples of the monomer to be used in the present invention, (meth)acrylic acids, 2-acrylamido-2-methyl propane sulfonic acid, 2-(meth)acryloyl ethane sulfonic acid and metal salts and ammonium salts thereof, (meth)acrylamides, acrylonitrile, maleic acid, and fumaric acid, half esters of such unsaturated dibasic acids, metal salts and ammonium salts of such dibasic acids and half esters, of such unsaturated dibasic acids, metal salts and ammonium salts of such dibasic acid and half esters, 2-hydroxyethyl (meth)acrylates, and 2-hydroxypropyl (meth)acrylates can be cited. One or more members selected from the monomers cited above may be used. Optionally, such a monomer as methyl (meth)acrylate, ethyl (meth)acrylate, propyl (meth)acrylate, vinyl acetate, or vinyl propionate may be additionally used in an amount not so large as to impair heavily the hydrophilicity of the hydrated gel polymer to be consequently obtained. For the purpose of ensuring production of a water-swellable hydrated gel polymer, such a cross-linking agent as ethylene glycol diacrylate, ethylene glycol dimethacrylate, diethylene glycol diacrylate, diethylene glycol dimethacrylate, triethylene glycol diacrylate, triethylene glycol dimethacrylate, polyethylene glycol diacrylate, polyethylene glycol dimethacrylate, trimethylol propane triacrylate, trimethylol propane trimethacrylate, pentaerythritol triacrylate, pentaerythritol trimethacrylate, N,N'-methylene-bis-acrylamide, triallyl isocyanurate, pentaerythritol diacrylate, or pentaerythritol dimethacrylate, for example, may be used in combination with the aforementioned monomer. The cross-linking agent may be used in an amount of not more than 50% preferably 0.01 to 10% more preferably 0.02 to 1% by weight, based on the total monomers.

In all the monomers cited above by way of exemplification, the group comprising acrylic acid, metal salts and ammonium salt of acrylic acid, acrylamide, 2-hydroxy (meth)acrylates, and acrylonitrile is characterized by manifesting strong toxicity. To the hydrated gel polymer obtained by polymerizing a monomer component containing at least 10% by weight of at least one member selected from the group just mentioned, the method of the present invention can be advantageously applied. This method is applied particularly advantageously to the hydrated gel polymer which is a cross-linked homopolymer of acrylic acid or an alkali metal salt and/or ammonium salt of acrylic acid, or a cross-linked copolymer of an alkali metal salt and/or ammonium salt of acrylic acid with acrylic acid. In this case molar ratio of the acrylate to acrylic acid is 0:100 to 100:0, preferably 20:80 to 100:0, more preferably 50:50 to 85:15.

The polymerization for the production of the hydrated gel polymer is accomplished by preparing an aqueous monomer solution having a monomer component, a polymerization initiator, and optionally a cross-linking agent dissolved in water, deaerating the aqueous monomer solution with such an inactive gas as nitrogen gas, and thereafter subjecting the deaerated aqueous monmoer solution to the casting polymerization which is carried out in a frame as disclosed in Japanese Patent Publication SHO 48(1973)-42,466, the polymerization which is carried out as carried on a belt conveyor as disclosed in Japanese Patent Laid-Open SHO 58(1983)-49,714, the polymerization which is carried out in a kneader provided therein with stirring blades capable of finely dividing the produced hydrated gel polymer as disclosed in Japanese Patent Laid-Open SHO 57(1982)-34,101, the reverse phase suspension polymerization which is carried out as disclosed in Japanese Patent Publication SHO 59(1984)-37,003, or the polymerization after spraying or coating the monomers on fibrous substrate as disclosed in Japanese Patent Laid-Opens SHO 61(1986)-275,355, SHO 62(1987)-243,612, and SHO 62(1987)-53,309, for example.

As examples of the polymerization initiator suitable for use herein, there can be cited, but not limited to such as ammonium persulfate and potassium persulfate, hydrogen peroxide, and 2,2'-azobis(2-amidinopropane)-hydrochloride (produced by Wako Pure Chemical Industries Ltd. and marketed under product code of "V-50"), preferably the persulfate can Such redox type initiators as combinations of the polymerization initiators mentioned above with such reducing agents as sodium hydrogensulfite, L-ascorbic acid, and ferrous salts are also available. Water content of the hydrated gel polymer is usually 25 to 90% preferably 40 to 80% by weight The polymerization initiator is used in an amount of 0.0001 to 0.5% preferably 0.0002 to 0.1% by weight, based on the monomer in case of the water soluble polymer, and in an amount of 0.01 to 2% preferably 0.05 to 1% based on the monomer in case of the water-swellable polymer.

For the purpose of working this invention, the hydrated gel polymer is desired to have a small residual monomer content, and contains usually 0.1 to 10% by weight of the residual monomer content. If the hydrated gel polymer happens to have a large residual monomer content, however, the method of this invention is capable of producing a water-soluble or water-swellable polymer having a small residual monomer content.

At times the hydrated gel polymer is produced by the polymerization in an already disintegrated form. In most cases, however, it is required to be produced in a form capable of being finely divided by drying. The fine division, for example, can be attained by disintegration with a meat chopper, an extruder, or a kneader.

The gas to be used in this invention for the purpose of drying the hydrated gel polymer and, at the same time, decreasing the residual monomer content thereof is not limited and should have a dew point in of 50° to 100° C. Preferably it is a steam-air mixed gas and/or a steam-inactive gas mixed gas or steam. For the purpose of permitting effective decrease of the residual monomer content, it is particularly preferable to have the dew point thereof in the range of 60° to 100° C. Drying temperature is 80° to 250° C., and preferably 100° to 180° C. in respect of ensuring efficient drying, permitting effective decrease of the residual monomer content, and preventing the produced polymer from deterioration by heat. The drying temperature means a temperature of at least one of the gas to be used and a hydrated gel polymer to be dried. As the inactive gas, there are nitrogen, carbon dioxide, and helium. As the drying device to be used in this invention, there can be cited a conduction heat-transfer type drier such as drum drier and paddle drier, a radiation heat-transfer type drier such as infrared drier and far infrared drier, a hot air heat-transfer type drier, and a dielectric heating drier can be used and is not limited, but the hot air heat-transfer type drier (hereinafter referred to a hot air drier) is preferable because of fast drying. As examples of the hot-air drier to be advantageously used in this invention, driers of the through flow band type, through flow rotary type, through flow vertical type, parallel flow band type, through flow tunnel type, through flow groove stirring type, fluidized bed type, air current type, and spray type can be cited. And the method for drying for feeding a hot air having a dew point of 50° to 100° C. and a temperature of 80° to 250° C. to a drying zone is the most preferable.

For the execution of the method of this invention, the drying of the hydrated gel polymer may be carried out continuously under the conditions defined by this invention until the polymer is dried as thoroughly as aimed at. The drying may be carried out, when occasion demands, under the conditions specified by this invention in the first half stage and continued in the last half stage until completion by an entirely different method such as the drying resorting to gas having a dew point of less than 50° C. or the other drying than the present invention such as drying in vacuo. When the drying is performed in the this manner, it is preferable for the hydrated gel polymer to be dried under the conditions specified by this invention until the solids content thereof reaches a level exceeding 60% by weight, preferably 80% more preferably 90% by weight. Further, the hydrated gel polymer after polymerization is dried under other condition than this invention and then hydrated to obtain the hydrated gel polymer, and it can be dried under the condition defined by the present invention.

The gas in a drier for the purpose of the drying is desired to be kept at a temperature of 80° to 250° C., preferably 100° to 180° C. If the temperature of the mixed gas is less than 80° C., the drying is not sufficiently effective in decreasing the residual monomer content of the hydrated gel polymer and the drying is not efficient enough to render the method economically feasible. If this temperature is higher than 250° C., however, the method is not quite feasible because the drying may possibly induce the polymer to undergo deterioration by heat often to the extent of degrading the quality thereof. The dew point of the mixed gas is desired to fall in the range of 50° to 100° C., preferably of 60° to 100° C. Any dew point below 50° C. is not acceptable from the practical point of view because the mixed gas is not sufficiently effective in decreasing the residual monomer content of the hydrated gel polymer.

The polymer thus obtained is remarkably, decreased in residual monomer content, for example, it is decreased to not more than 0.3% by weight in the water soluble polymer, and especially it is decreased to not more than 0.05% preferably 0.02% by weight, in the water-swellable polymer wherein decrease of the residual monomer content is highly required.

Now, the present invention will be described more specifically below with reference to working examples. It should be noted, however, that the scope of the present invention is not limited to these examples.

EXAMPLES 1 to 10

In a jacketed stainless steel twin-arm kneader having an inner volume of 10 liters, an opening 220×260 mm in area, and a depth of 2·0 mm, and provided with two Sigma type blades 120 mm in rotary diameter and also provided with a lid 5,000 g of an aqueous solution of acrylic monomers containing 75 mol % of sodium acrylate and 25 mol % of acrylic acid (monomer concentration 40%) and 2.2 g of methylene-bis-acrylamide Then, nitrogen gas was blown through the kneader to displace the air entrapped in the reaction system. Then, the two Sigma type blades were rotated at respective speeds of 67 and 56 r.p.m. and warm water kept at 35° C. was passed through the jacket to heat the kneader and, as polymerization initiators, 2.5 g of ammonium persulfate and 2.5 g of sodium hydrogensulfite were added to the contents of the kneader. The monomer in the kneader began to polymerize 5 minutes after the addition of the polymerization initiators. The temperature of the kneader interior reached 83° C., 20 minutes after the addition of the polymerization initiators, with the gel polymer finely divided into small pieces about 5 mm in diameter. The stirring of the contents of the kneader was further continued. A total of 60 minutes after the initiation of the polymerization, the kneader was opened by removal of the lid and the hydrated gel polymer was removed from the kneader. This hydrated gel polymer was found to contain unaltered acrylic acid and sodium acrylate in a total concentration of 10,000 ppm.

In a hot-air drier (through floor type produced by Kabushiki Kaisha Ohkawara Seisakusho and constructed as illustrated in FIG. 1)8, the hydrated gel polymer 1 was spread in a uniform thickness of 40 mm. It was then heated with gases introduced through a fresh air inlet 2 and a steam inlet 3 and a heat transfer medium introduced first through a heat exchanger 6 and then through as heat transfer medium inlet 7 and swept with a steam-air mixed gas, a steam-inactive gas mixed gas, or steam each kept at a temperature of 100° to 180° C. and adjusted to a dew point of 60° to 100° C. until the water content thereof fell to 10% by weight, to give rise to a water-swellable polymer. Part of the gas was released through a discharge pipe 4 and the dried product was transferred to a heat exchanger 6 with a blower 5. This water-swellable polymer was crushed to obtain a water-swellable polymer powder, which was tested for residual monomer content and absorption ratio as follows. The residual monomer content was determined by dispersing 0.5 g of a sample powder in 1,000 ml of deionized water, stirring the powder in the water for 2 hours, passing the resultant mixture through a Whatman's filter paper GF/F (particle retaining capacity 0.7 micron), and subjecting the filtrate to liquid chromatography.

The absorption ratio was determined by uniformly placing 0.2 g of a sample powder in a bag (40 mm × 150 mm) formed with non-woven fabric after the pattern of a tea bag, immersing the bag in an aqueous solution containing 0.9% by weight of common salt, weighing the wet bag after 30 minutes' standing in the aqueous solution, and calculating the following formula using the found weight.

$$\text{Absorption ratio} = \frac{\text{Weight (g) after absorption} - \text{Blank (g)}}{\text{Weight of sample powder (g)}}$$

The results are shown in Table 1.

Controls 1 to 5

Water-swellable polymers for comparison were obtained by following the procedure of Example 1, except that hot air kept at a temperature in the range of 120° to 180° C. and adjusted to a dew point of 5° C. 20° C. and 40° C. was used in place of the steam-air mixed gas, the steam-inactive gas mixed gas, or steam. The water-swellable polymers for comparison were tested in the same manner as in Example 1. The results are shown in Table 1.

The water-swellable polymers produced where the dew points of hot air at the inlet of the hot air drier were kept at 60° C., 80° C., and 100° C. had notably lower residual monomer contents than those produced where the dew points were 5° C., 20° C., and 40° C.

TABLE 1

|  | Hot air | | | Drying time (min.) | Solids content (%) | Residual monomer content (ppm) | Absorption ratio (g/g) |
| --- | --- | --- | --- | --- | --- | --- | --- |
|  | Temperature (°C.) | Dew point (°C.) | Kind | | | | |
| Example 1 | 180 | 100 | Steam | 30 | 96 | 160 | 57 |
| 2 | 180 | 80 | Steam-air mixed gas | 30 | 96 | 150 | 56 |
| 3 | 180 | 60 | Steam-air mixed gas | 30 | 95 | 360 | 54 |
| 4 | 150 | 100 | Steam | 40 | 94 | 120 | 56 |
| 5 | 150 | 80 | Steam-air mixed gas | 40 | 95 | 100 | 54 |
| 6 | 150 | 60 | Steam-air mixed gas | 40 | 94 | 280 | 54 |
| 7 | 120 | 100 | Steam | 60 | 92 | 60 | 55 |
| 8 | 120 | 80 | Steam-air mixed gas | 60 | 93 | 30 | 54 |
| 9 | 100 | 60 | Steam-air mixed gas | 90 | 91 | 400 | 55 |
| 10 | 120 | 80 | Steam-$N_2$ mixed gas | 80 | 93 | 20 | 56 |
| Control 1 | 180 | 5 | Steam-air mixed gas | 30 | 96 | 900 | 57 |
| 2 | 150 | " | Steam-air mixed gas | 40 | 96 | 1300 | 56 |
| 3 | 120 | 40 | Steam-air mixed gas | 60 | 92 | 900 | 56 |
| 4 | " | 20 | Steam-air mixed gas | 60 | 93 | 1400 | 54 |
| 5 | " | 5 | Steam-air mixed gas | 60 | 93 | 1500 | 54 |

EXAMPLE 11

In the same device as used in Example 1, the same hydrated gel polymer as obtained in Example 1 was dried by being swept with a hot air formed of a steam-air mixed gas kept at a temperature of 120° C., adjusted to a dew point of 80° C., and blown at a rate of 1.0 m/sec until the solids content reached 80%. The partly dried hydrated gel polymer was further dried to a water content of not more than 10% by weight by being swept with a current of hot air kept at a temperature of 180° C., adjusted to a dew point of 5° C., and blown at a rate of 1.0 m/sec. The dried polymer was pulverized. The pulverized polymer was tested for residual monomer content and absorption ratio by following the procedure of Example 1. The results are shown in Table 2.

As shown in Table 2, virtually no difference was found in the comparison between the water-swellable polymer obtained by effecting the drying with the hot air of steam-air mixed gas in the first half stage and continuing the drying with the unmoistened hot air, in the last half stage and the water-swellable polymer obtained by effecting the drying with the hot air of steam-air mixed gas throughout the entire course.

TABLE 2

| | Drying in 1st stage | | | | | Drying in second stage | | | | |
| --- | --- | --- | --- | --- | --- | --- | --- | --- | --- | --- |
| | Hot air | | | | | | | | | |
| | Temperature (°C.) | Dew point (°C.) | Speed of air (m/sec.) | Drying time (min.) | Solids content (%) | Drying Temperature (°C.) | Dew point (°C.) | Drying time (min.) | Solids content (%) | Residual monomer (ppm) |
| Example 11 | 120 | 80 | 1 | 30 | 81 | 180 | 5 | 20 | 95 | 40 |
| 8 | 120 | 80 | 1 | 60 | 93 | — | — | — | — | 30 |

TABLE 2-continued

| | Drying in 1st stage | | | | | Drying in second stage | | | | |
|---|---|---|---|---|---|---|---|---|---|---|
| | Hot air | | | | | | | | | |
| | Temperature (°C.) | Dew point (°C.) | Speed of air (m/sec.) | Drying time (min.) | Solids content (%) | Drying Temperature (°C.) | Dew point (°C.) | Drying time (min.) | Solids content (%) | Residual monomer (ppm) |
| Control 3 | 120 | 0 | 1 | 50 | 95 | — | — | — | — | 1500 |

EXAMPLES 12 and 13

Powdered hydrated gel polymers were obtained by following the procedure of Example 1, except that monomer components of varying compositions shown in Table 3 were used instead. The hydrated gel polymers were dried and pulverized by following the procedure of Example 1 (except that a steam-air mixed gas kept at a temperature of 120° C. and adjusted to a dew point of 80° C. was used instead), to obtain water-swellable and water-soluble polymer powders. These powders are tested for residual monomer content under the same conditions as those of Example 1. The results are shown in Table 4.

CONTROLS 6 and 7

Powdered water-swellable and water-soluble polymers for comparison were obtained by following the procedure of Examples 12 and 13, except that a hot air kept at a temperature of 120° C. and adjusted to a dew point of 5° C. was used in place of the hot air of steam-air mixed gas kept at a temperature 120° C. and adjusted to a dew point of 80° C. These powders were tested for residual monomer content under the same conditions as those of Example 1. The results are shown in Table 4.

As clearly noted from Table 4, the product obtained by the drying using the hot air of steam-air mixed gas kept at a temperature of 120° C. and adjusted to a dew point of 80° C. had a smaller residual monomer content than the product obtained by the drying using a hot air kept at a temperature of 120° C. and adjusted to a dew point of 5° C.

EXAMPLE 14

Figure 3:
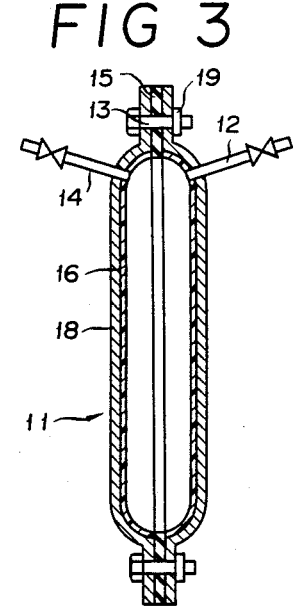
FIG. 3 is a schematic cross all view along with the line III—III.
Figure 2:
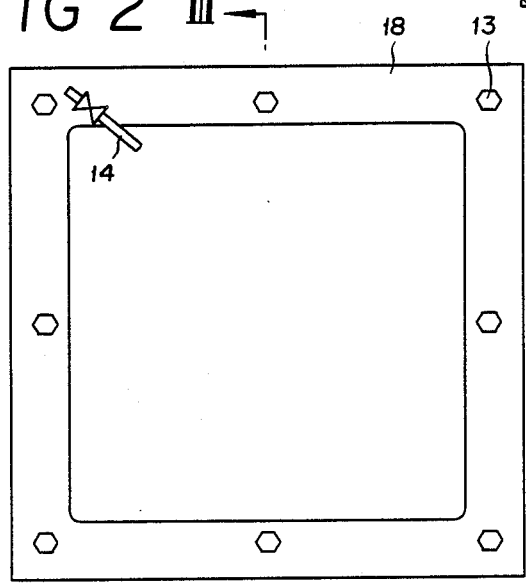
FIG. 2 is a schematic front view of a polymerization device used in Examples 14 to 16 of this invention and Controls 8 to 10.

In a device constructed as illustrated in FIGS. 2 and 3, namely a casting polymerization device (having an inner volume of 1.6 liters and measuring 230 mm in length × 230 mm in length × 30 mm in width) 11, lined with a fluorine resin film 16, and sealed with a rubber packing 15 interposed between two vessel members 18 of stainless steel sheets by fixing by bolts 13 and nuts 19, were introduced 2,000 g of an aqueous sodium acrylate solution having a concentration of 40% by weight and displaced with nitrogen in advance, 0.04 g of ammonium persulfate, and 0.02 g of sodium hydrogensulfite through a raw material inlet 12 and air was purged through an air outlet 14. This casting polymerization device was placed in a water bath provided with a stirrer and a temperature controller and the monomer in the device was set polymerizing, with the temperature of the water bath kept at 30° C. for removal of the heat of reaction. After 5 hours following the initiation of polymerization, the hydrated gel polymer was removed from the casting polymerization device, cut into cords with a meat chopper and, then by following the procedure of Examples 12 and 13, dried and pulverized. Consequently, a water-soluble polymer powder was obtained. The powder was tested for residual monomer content by the bromine addition method. An aqueous solution of 0.2 g of the powder in 100 g of water was tested for viscosity at 25° C. with a Brookfield viscosimeter. The results are shown in Table 5. Control 8.

A water-soluble polymer for comparison was obtained by following the procedure of Example 14, except that a hot air kept at a temperature of 120° C. and adjusted to a dew point of 5° C. was used of the hot air of steam-air mixed gas. The water-soluble polymer for comparison was tested in the same manner as in Example 14. The results are shown in Table 5.

TABLE 3

| Hydrated gel polymer | Composition of monomer component (mol %) | | | | Initiator (wt %) | | Cross-linking agent (mol %) MBAA | Monomer concentration (wt %) |
|---|---|---|---|---|---|---|---|---|
| | AA | SA | AAm | HEA | APS | SBS | | |
| Example 12 | 0 | 20 | 80 | 0 | 0.1 | 0.1 | 0.1 | 40 |
| 13 | 20 | 70 | 0 | 10 | 0.1 | 0 | 0 | 40 |

AA: Acrylic acid
SA: Sodium acrylate
AAm: Acrylamide
HEA: Hydroxyethyl acrylate
APS: Ammonium persulfate
SBS: Sodium hydrogensulfite
MBAA: Methylene-bis-acrylamide

TABLE 4

| | Hydrated gel polymer | Hot air | | | Drying time (min.) | Solids content (wt %) | Residual monomer content (ppm) | | |
|---|---|---|---|---|---|---|---|---|---|
| | | Temperature (°C.) | Dew point (°C.) | Speed of air (m/sec.) | | | AA | AAm | HEA |
| Example 12 | 12 | 120 | 80 | 1 | 60 | 93 | 10 | 20 | |
| Control 6 | 12 | 120 | 5 | 1 | 50 | 95 | 300 | 400 | |
| Example 13 | 13 | 120 | 80 | 1 | 60 | 92 | 50 | — | 10> |
| Control 7 | 13 | 120 | 5 | 1 | 50 | 94 | 1,000 | — | 100 |

It is noted from Table 5 that the product obtained by the drying using the hot air of steam-air mixed gas kept at temperature of 120° C and adjusted to a dew point of 80° C. had a smaller residual monomer content than the product by the drying using the hot air adjusted to a dew point of 5° C.

TABLE 5

| | Hot air | | | Drying time (min.) | Solids content (wt %) | Residual monomer (ppm) | Viscosity of aqueous solution (c.p.) |
|---|---|---|---|---|---|---|---|
| | Temperature (°C.) | Dew point (°C.) | Speed of air (m/sec.) | | | | |
| Example 14 | 120 | 80 | 1 | 60 | 94 | 1,000 | 1,100 |
| Control 8 | 120 | 5 | 1 | 50 | 95 | 6,000 | 600 |

EXAMPLES 15 and 16

An elastic hydrated gel polymer was obtained by following the procedure of Example 14, except that a monomer component containing 480 g of acrylamide and 320 g of sodium acrylate was used, in place of 800 g of sodium acrylate. This polymer was cut into cords in the same manner as in Example 14, dried with a rotary through flow type drier (produced by Kabushiki Kaisha Ohkawara Seisakusho and marketed under product code of "PTA-30") by being swept with a hot air of steam-air mixed gas kept at a varying temperature (120° C. in Example 16 and 150° C. in Example 15) and adjusted to a dew point of 80° C. until the water content fell to below 10% by weight, and pulverized, to obtain a water-soluble polymer powder. The powder was tested for residual monomer content by the same method as in Example 14. The results are shown in Table 6.

CONTROLS 9 and 10

Water-soluble polymer powders for comparison were obtained by following the procedure of Examples 15 and 16, except that a hot air kept at a varying temperature (120° C. in Control 10 or 150° C. Control 9) and adjusted to a dew point of 5° C. was used in place of the hot air of steam-air mixed gas. The results are shown in Table 6.

It is noted from Table 6 that the product obtained by the drying keeping the dew point of the steam-air mixed gas at the inlet of the hot air drier at 80° C. had a notably smaller residual monomer content than the product obtained by keeping the dew point at 5° C.

TABLE 6

| | Hot air | | | Drying time (min.) | Solids content (%) | Residual monomer content (ppm) |
|---|---|---|---|---|---|---|
| | Drying temperature (°C.) | Dew point (°C.) | Speed of air (m/sec.) | | | |
| Example 15 | 150 | 80 | 1 | 40 | 95 | 2,200 |
| Example 16 | 120 | 80 | 1 | 60 | 94 | 1,300 |
| Control 9 | 150 | 5 | 1 | 40 | 96 | 7,200 |
| Control 10 | 120 | 5 | 1 | 60 | 95 | 9,300 |

EXAMPLE 17

A flask having an inner volume of 5,000 ml and provided with a reflux condenser, with the entrapped air displaced with nitrogen in advance, was charged with 2,130 g of cyclohexane and 19 g of sorbitan monolaurate having a HLB 8.6. At room temperature, the contents of the flask were stirred to dissolve the surfactant. To the stirred contents of the flask, an aqueous solution of a monomer component prepared by adding 1.3 g of potassium persulfate to 1,200 g of an aqueous solution of 25 mol % of acrylic acid and 75 mol % of sodium acrylate (concentration 40% by weight) was added dropwise to be suspended. Again, the air entrapped in the flask was displaced thoroughly with nitrogen The bath temperature was kept at 55° C. to 60° C. for 3 hours, to effect polymerization of the monomer in the flask. The resultant polymerization solution was filtered The polymer consequently obtained was dried in a fluidized-bed type drier (produced by Kabushiki Kaisha Ohkawara Seisakusho and marketed under product code of "FCS-1") by being swept with a hot air of steam-air mixed gas kept at a temperature of 120° C. and adjusted to a dew point of 80° C. until the water content fell to below 10% by weight. The dried polymer was pulverized to obtain a water-swellable polymer powder, which was tested for residual monomer content by the same method as in Example 1. The results are shown in Table 7.

CONTROL 11

A water-swellable polymer powder for comparison was obtained by following the procedure of Example 17, except that a hot air kept at a temperature of 120° C. and adjusted to a dew point of 5° C. was used in the place of the hot air of steam-air mixed gas. This powder was tested for residual monomer content by the same method as in Example 17. The results are shown in Table 7.

It is clearly noted from Table 7 that the product obtained by the drying adjusting the dew point of the steam-air mixed gas at the inlet of the hot air drier at 8° C. had a notably lower residual monomer content than the product obtained by the drying of the other method.

TABLE 7

| | Hot air | | Solids content (%) | Residual monomer content (ppm) |
|---|---|---|---|---|
| | Drying temperature (°C.) | Dew point (°C.) | | |
| Example 17 | 120 | 80 | 94 | 30 |
| Control 11 | 120 | 5 | 93 | 250 |

EXAMPLE 18

Hydrated gel polymer obtained in Example 1 was charged to box drier (600 mm × 600 mm × 600 mm) provided with a far infrared ray radiation ceramic heater (SF type Infrajet 2000 W, manufactured by Jard Kabushiki Kaisha) wherein atmosphere was previously controlled to 80° C. of dew point by passing air-steam mixed gas, so as to become 20 mm of thickness, and the gel polymer was dried for 30 minutes to a water content of 10% by weight by the far infrared radiation ceramic heater. During the drying, a gas temperature just over the gel polymer was 120° C. The dried gel polymer was crushed and the residual monomer content and absorption ratio were determined by a similar method to Example 1. The results are shown in Table 8.

CONTROL 12

Dried gel polymer was obtained by repeating a similar method to Example 18 except that the dew point of the atmosphere was controlled to not more than 20° C. by previously passing air in the method of Example 18. During the drying, a gas temperature just over the gel polymer was 120° C. The dried gel polymer was crushed, and the residual monomer content and absorption ratio were determined by a similar method to Example 1. The results are shown in Table 8.

As shown in Table 8, the gel polymer dried in the atmosphere of 80° C. of the dew point was remarkably decreased in the residual monomer content compared to the gel polymer dried in the atmosphere of not more than 20° C. of the dew point.

TABLE 8

|  | Residual monomer content (ppm) | Absorption ratio (g/g) |
| --- | --- | --- |
| Example 18 | 50 | 55 |
| Control 8 | 900 | 54 |

EXAMPLE 19

Hydrated gel polymer obtained in Example 1 was dried in a double drum drier (effective drum are 1.0 m²) provided scraper as described in Japanese Patent Publication SHO 55(1980)-21,041 wherein an atmosphere was previously controlled to 80° C. of the dew point and 120° C. of the temperature by passing air-steam mixed gas at a drum temperature of 140° C. under conditions of 1 rpm of rotation number and 1 mm of thickness of the gel polymer, and the dried gel polymer was crushed, and the residual monomer content and absorption ratio were determined by a similar method to Example 1. The results are shown in Table 9.

Control 13

Dried gel polymer was obtained by repeating a similar method to Example 19 except that the atmosphere was controlled to 20° of the dew point and 120° C. of the temperature by passing air in the method of Example 19. The dried gel was crushed, and the residual monomer content and absorption ratio were determined by a similar method to Example 1. The results are shown in Table 9.

As shown in Table 9, the gel polymer dried in the atmosphere of 80° C. of the dew point was remarkably decreased in the residual monomer content compared to the gel polymer dried in the atmosphere of 20° C. of the dew point.

TABLE 9

|  | Residual monomer content (ppm) | Absorption ratio (g/g) |
| --- | --- | --- |
| Example 19 | 60 | 56 |
| Control 13 | 960 | 53 |

CONTROL 14

An aqueous solution polymerization was carried out by a similar method to Example 1, and after 20 minutes of addition of the polymerization initiator, the temperature of the reaction system was 83° C. and it reached maximum temperature. Just after reaching the maximum temperature, hot water in a jacket was varied from 35° C. to 95° C. and heating was continued for 5 hours. Sampling was carried out for every one hour and the samples were analyzed to obtain the results shown in Table 10.

TABLE 10

| Heating time after reaching maximum temperature (hr) | 1 | 2 | 3 | 4 | 5 |
| --- | --- | --- | --- | --- | --- |
| Temperature of atmosphere in the reaction system (°C.) | 87 | 87 | 87 | 87 | 87 |
| Dew point of atmosphere in the reaction system (°C.) | 85 | 85 | 85 | 85 | 85 |
| Solid content in hydrated gel polymer (% by weight) | 41 | 42 | 42 | 42 | 43 |
| Residual monomer content in hydrated gel polymer (% by weight) | 0.4 | 0.3 | 0.22 | 0.18 | 0.16 |

As shown in Table 10, aging is carried out under the condition that the solid content does not almost vary even in the high humidity cannot attain the low level of the residual monomer content as in Example 1, in spite of long time treatment. Example 20

1.4 g of methylene-bis-acrylamide and 4.0 g of ammonium persulfate were dissolved in 5,000 g of an aqueous solution of acrylic monomers containing 75 mol % of sodium acrylate and 25 mol % of acrylic acid (monomer concentration 40%) under removing dissolved oxygen through blowing nitrogen gas. The solution thus obtained was sprayed on a polyester non-woven fabric having a weight of 100 g/m² using a spray nozzle so that the aqueous solution of monomers adhered in an amount of 350 g/m², and then a hydrated gel polymer compositely with the polyester non-woven fabric by heat polymerization for 10 minutes.

The composite hydrated gel polymer was subjected to drying by flowing a mixed gas of steam and air having a temperature of 130° C. and a dew point of 90° C. at a rate of 1.0 m/sec in the same drier as used in Example 1 to obtain a water-absorbable composite material wherein a water-swellable polymer is carried on the polyester non-woven fabric having not more than 10% by weight of water content. Water content of the water-swellable polymer in the water-absorbable composite material was 7% by weight.

Residual monomer content and absorption ratio of the water-absorbable composite material were determined by the following methods: The residual monomer content was determined by cutting the water absorbable composite material so as to become 0.5 g of the polymer amount and measuring it and then dispersing it in 1,000 ml of deionized water, stirring it 2 hours, passing the resultant mixture through a Whatman's filter paper GF/F (particle retaining capacity 0.7 micron), and subjecting the filtrate to liquid chromatography to obtain residual monomer content to the water-swellable polymer in the water-absorbable composite material.

The absorption ratio was determined by uniformly placing 0.5 g of finely cut water absorbable composite material in a bag (40 mm × 150 mm) formed with non-woven fabric after the pattern of tea bag, immersing the bag in an aqueous solution containing 0.9% by weight of sodium chloride, weighing the wet bag after 30 minute's standing in the aqueous solution, and calculating the following formula using the found weight, $$\text{Absorption ratio} = \frac{W - W_o}{W_p}$$

W: Weight of tea bag after absorption
$W_o$: Weight of only tea bag (blank) after absorption
$W_p$: Weight of water absorbable composite material Method for Determination of Solid Content: The solid content of the water-absorbable polymer in the absorbable composite material was determined from a drying loss obtained by drying with a hot air having a temperature of 150° C. for one hour after rectifying the weight of the fibrous substrate.

The results are shown in Table 11.

Control 15

Water-absorbable composite material for comparison were obtained by following the procedure of Example 20, except that hot air kept at a temperature in 130° and adjusted to a dew point of 5° C. was used in the place of the steam-air mixed gas. The water-absorbable composite material for comparison were tested in the same manner as in Example 20. The results are shown in Table 11.

TABLE 11

|  | Residual monomer (ppm) to the polymer | Absorption ratio to the composite | Solid content (% by weight) |
|---|---|---|---|
| Example 20 | 100 | 40 | 93 |
| Control 15 | 3,200 | 38 | 94 |

What is claimed is:

1. A method for the production of a hydrophilic polymer having a small residual monomer content from a hydrated gel polymer, which method comprises drying said hydrated gel polymer by contact thereof with a gas containing at least steam and having a dew point in the range of 50° to 100° C. at a temperature in the range of 80° C. to 250° C.

2. A method according to claim 1, wherein said gas containing at least steam is at least one member selected from the group consisting of steam-air mixed gas, steam-inactive gas mixed gas, and steam.

3. A method according to claim 2, wherein said gas containing at least steam has a dew point in the range of 60° to 100° C.

4. A method according to claim 2, wherein said contact is carried out by a hot air having a dew point of 50° to 100° C. and a temperature of 80° to 250° C.

5. A method according to claim 3, wherein the drying temperature is in the range of 100° C. to 180° C.

6. A method according to claim 1, wherein said hydrated gel polymer has been obtained by polymerizing a monomer component containing at least 10% by weight of at least one monomer selected from the group consisting of (meth)acrylic acid, 2-acrylamido-2-methyl propane sulfonic acid, 2-(meth)acryloyl ethane sulfonic acid, metal salts and ammonium salts of (meth)acrylic acids, acrylamide, hydroxyethyl (meth)acrylates, and acrylonitrile.

7. A method according to claim 6, wherein said hydrated gel polymer is obtained by polymerizing a monomer component containing at least 30% by weight of said monomer.

8. A method according to claim 5, wherein said hydrated gel polymer is a cross-linked polymer of at least one monomer selected from the group consisting of acrylic acid, an alkali metal salt of acrylic acid and ammonium salt of acrylic acid.

9. A method according to claim 8, wherein said hydrated gel polymer is obtained by polymerization using a persulfate as a polymerization initiator.

10. A method according to claim 9, further using a reducing agent.

11. A method according to claim 1, which comprises effecting said drying of said hydrated gel polymer by contact thereof with said gas containing at least steam and having a dew point in the range of 50° C. to 100° C. at a temperature in the ranging of 80° C. to 250° C. until the solids content thereof reaches a level exceeding 60% by weight and then continuing the drying thereof by other method.

12. A method according to claim 11, wherein the solids content of said hydrated gel polymer is at least 80% by weight.

13. A method according to claim 1, wherein said hydrated gel polymer is sole particles of said polymer.

14. A method according to claim 1, wherein said hydrated gel polymer is adhered to a fibrous substrate.

15. A method according to claim 2, wherein said drying is carried out in a conduction heat-transfer type drier.

16. A method according to claim 2, wherein said drying is carried out in a radiation heat-transfer type drier.

17. A method according to claim 2, wherein said drying is carried out in a dielectric heat type drier.

* * * * *